US012231937B2

(12) United States Patent
Hindy et al.

(10) Patent No.: US 12,231,937 B2
(45) Date of Patent: Feb. 18, 2025

(54) CONFIGURING AN ARTIFICIAL INTELLIGENCE BASED FRAMEWORK

(71) Applicant: Lenovo (Singapore) Pte. Ltd., New Tech Park (SG)

(72) Inventors: Ahmed Hindy, Aurora, IL (US); Ankit Bhamri, Rödermark (DE); Vijay Nangia, Woodridge, IL (US)

(73) Assignee: Lenovo (Singapore) Pte. Ltd., New Tech Park, Singapore (SG)

( * ) Notice: Subject to any disclaimer, the term of this patent is extended or adjusted under 35 U.S.C. 154(b) by 496 days.

(21) Appl. No.: 17/550,654

(22) Filed: Dec. 14, 2021

(65) Prior Publication Data

US 2023/0189030 A1    Jun. 15, 2023

(51) Int. Cl.
*H04W 24/10* (2009.01)
*G06N 5/02* (2023.01)

(52) U.S. Cl.
CPC ............ *H04W 24/10* (2013.01); *G06N 5/027* (2013.01)

(58) Field of Classification Search
CPC ..... H04W 24/10; G06N 5/027; H04B 7/0478; H04B 7/0626; H04L 5/0048; H04L 5/0057
See application file for complete search history.

(56) References Cited

U.S. PATENT DOCUMENTS

| 2018/0091272 | A1 | 3/2018 | Wang et al. |
| 2020/0367193 | A1 | 11/2020 | Cha et al. |
| 2021/0050889 | A1 | 2/2021 | Park et al. |
| 2021/0234662 | A1* | 7/2021 | Qi ........................ H04L 5/0035 |

(Continued)

FOREIGN PATENT DOCUMENTS

| WO | 2021214711 A1 | 10/2021 |
| WO | WO-2022236785 A1 * | 11/2022 |
| WO | WO-2023012999 A1 * | 2/2023 |

OTHER PUBLICATIONS

PCT/IB2022/061673, "Notification of Transmittal of the International Search Report and the Written Opinion of the International Searching Authority, or the Declaration", International Searching Authority, Feb. 3, 2023, pp. 1-13.

(Continued)

*Primary Examiner* — Ayaz R Sheikh
*Assistant Examiner* — David Zhijun Sun
(74) *Attorney, Agent, or Firm* — Kunzler Bean & Adamson

(57) ABSTRACT

Apparatuses, methods, and systems are disclosed for configuring an AI based framework. One method includes receiving a first indication indicating an AI based framework. The method includes receiving configuration information corresponding to CSI report settings. The configuration information includes CSI RSs to be received at a UE; and the CSI RSs are transmitted over a frequency index, a spatial index, and/or a temporal index, and decomposed into two groups based on the frequency index, the spatial index, and/or the temporal index. The method includes generating first CSI based on a first group of the two groups of CSI RSs. The method includes transmitting a CSI report including the first CSI. The method includes communicating an AI based report corresponding to second CSI corresponding to a second group of the two groups of CSI RSs. The first AI based report for CSI includes a correlation between the first and second CSI.

20 Claims, 11 Drawing Sheets

(56) References Cited

U.S. PATENT DOCUMENTS

2023/0013510 A1* 1/2023 Ge ................... H04L 5/0094
2023/0421223 A1* 12/2023 Li ................... H04B 7/0456

OTHER PUBLICATIONS

PCT/IB2022/061674, "Notification of Transmittal of the International Search Report and the Written Opinion of the International Searching Authority, or the Declaration", International Searching Authority, Feb. 10, 2023, pp. 1-13.
ZTE et al., "Evolution of NR MIMO in Rel-17", 3GPP TSG RAN Meeting #85 RP-191845, Sep. 16-20, 2019, pp. 1-8.
ZTE et al., "Support of Artificial Intelligence Applications for 5G Advanced" 3GPP TSG RAN#93e RP-212383, Sep. 13-17, Retrieved Sep. 6, 2021, pp. 1-13.
ZTE et al., "Support of Artificial Intelligence Applications for 5G Advanced", 3GPP TSG RAN#94e RP-213387, Dec. 6-17, Retrieved Nov. 29, 2021, pp. 1-18.
3GPP, "3rd Generation Partnership Project; Technical Specification Group Radio Access Network; NR; Multiplexing and channel coding (Release 16)", 3GPP TS 38.212 V16.7.0, Sep. 2021, pp. 1-153.
3GPP, "3rd Generation Partnership Project; Technical Specification Group Radio Access Network; NR; Physical layer procedures for data, (Release 16)", 3GPP TS 38.214 V16.7.0, Sep. 2021, pp. 1-172.
3GPP, "3rd Generation Partnership Project; Technical Specification Group Radio Access Network; NR; Radio Resource Control (RRC) protocol specification (Release 16)", 3GPP TS 38.331 V16.6.0, Sep. 2021, pp. 1-961.
Samsung et al., "WF on Type I and II CSI codebooks", 3GPP TSG-RAN WG1 #89 R1-1709232, May 15-19, 2017, pp. 1-24.
Qualcomm, "On ML over the NR Air Interface", 3GPP TSG RAN Rel-18 workshop RWS-210024, Jun. 28-Jul. 2, 2021, pp. 1-7.
Futurewei, "ML/AI for Wireless", 3GPP TSG RAN Rel-18 Workshop RWS-210038, Jun. 28-Jul. 2, 2021, pp. 1-13.
Vivo, "Study on Ai/ML based air interface enhancement in Rel-18", 3GPP TSG RAN Rel-18 workshop RWS-210170, Jun. 28-Jul. 2, 2021, pp. 1-21.
ZTE et al., "Support of Artificial Intelligence Applications for 5G Advanced", 3GPP TSG RAN Rel-18 workshop RWS-210478, Jun. 28-Jul. 2, 2021, pp. 1-15.
Apple Inc., "Study on AI for physical layer design enhancement", 3GPP TSG RAN Rel-18 workshop RWS-210505, Jun. 28-Jul. 2, 2021, pp. 1-6.

* cited by examiner

500

```
-- ASN1START
-- TAG-CSI-REPORTCONFIG-START

CSI-ReportConfig ::=                    SEQUENCE {
    reportConfigId                          CSI-ReportConfigId,
    carrier                                 ServCellIndex               OPTIONAL,   -- Need S
    resourcesForChannelMeasurement          CSI-ResourceConfigId,
    csi-IM-ResourcesForInterference         CSI-ResourceConfigId        OPTIONAL,   -- Need R
    nzp-CSI-RS-ResourcesForInterference     CSI-ResourceConfigId        OPTIONAL,   -- Need R reportConfigType                        CHOICE {
        periodic                                SEQUENCE {
            reportSlotConfig                        CSI-ReportPeriodicityAndOffset,
            pucch-CSI-ResourceList                  SEQUENCE (SIZE (1..maxNrofBWPs)) OF PUCCH-CSI-Resource
        },
        semiPersistentOnPUCCH                   SEQUENCE {
            reportSlotConfig                        CSI-ReportPeriodicityAndOffset,
            pucch-CSI-ResourceList                  SEQUENCE (SIZE (1..maxNrofBWPs)) OF PUCCH-CSI-Resource
        },
        semiPersistentOnPUSCH                   SEQUENCE {
            reportSlotConfig                        ENUMERATED {sl5, sl10, sl20, sl40, sl80, sl160, sl320},
            reportSlotOffsetList                    SEQUENCE (SIZE (1..maxNrofUL-Allocations)) OF INTEGER(0..32),
            p0alpha                                 P0-PUSCH-AlphaSetId
        },
        aperiodic                               SEQUENCE {
            reportSlotOffsetList                    SEQUENCE (SIZE (1..maxNrofUL-Allocations)) OF INTEGER(0..32)
        }
    },
    AI-CSI-Enabled                          ENUMERATED {TRUE}           OPTIONAL,   -- Need R

[..................]
}

-- TAG-CSI-REPORTCONFIG-STOP
-- ASN1STOP
```

FIG. 5

```
-- ASN1START
-- TAG-CSI-REPORTCONFIG-START

CSI-ReportConfig ::=              SEQUENCE {
    reportConfigId                CSI-ReportConfigId,
    carrier                       ServCellIndex                OPTIONAL,   -- Need S
    resourcesForChannelMeasurement CSI-ResourceConfigId,
    csi-IM-ResourcesForInterference CSI-ResourceConfigId       OPTIONAL,   -- Need R
    nzp-CSI-RS-ResourcesForInterference CSI-ResourceConfigId   OPTIONAL,   -- Need R
    AI-Config                     AI-ConfigId                  OPTIONAL,   -- Need R reportConfigType              CHOICE {
        periodic                      SEQUENCE {
            reportSlotConfig              CSI-ReportPeriodicityAndOffset,
            pucch-CSI-ResourceList        SEQUENCE (SIZE (1..maxNrofBWPs)) OF PUCCH-CSI-Resource
        },
        semiPersistentOnPUCCH         SEQUENCE {
            reportSlotConfig              CSI-ReportPeriodicityAndOffset,
            pucch-CSI-ResourceList        SEQUENCE (SIZE (1..maxNrofBWPs)) OF PUCCH-CSI-Resource
        },
        semiPersistentOnPUSCH         SEQUENCE {
            reportSlotConfig              ENUMERATED {sl5, sl10, sl20, sl40, sl80, sl160, sl320},
            reportSlotOffsetList          SEQUENCE (SIZE (1..maxNrofUL-Allocations)) OF INTEGER(0..32),
            p0alpha                       P0-PUSCH-AlphaSetId
        },
        aperiodic                     SEQUENCE {
            reportSlotOffsetList          SEQUENCE (SIZE (1..maxNrofUL-Allocations)) OF INTEGER(0..32)
        }
    },

[..........................]

-- TAG-CSI-REPORTCONFIG-STOP
-- ASN1STOP
```

-- ASN1START
-- TAG-CODEBOOKCONFIG-START

CodebookConfig-r19    ::=              SEQUENCE {
    codebookType                           CHOICE {
        type3                                  SEQUENCE {
            subType                                CHOICE {
                typeIII-r19                            SEQUENCE {

[........................]

}
            }
        }
    }
}

-- TAG-CODEBOOKCONFIG-STOP
-- ASN1STOP
```

```
-- ASN1START
-- TAG-CSI-REPORTCONFIG-START

CSI-ReportConfig ::=                    SEQUENCE {
    reportConfigId                          CSI-ReportConfigId,
    carrier                                 ServCellIndex              OPTIONAL,   -- Need S
    resourcesForChannelMeasurement          CSI-ResourceConfigId,
    csi-IM-ResourcesForInterference         CSI-ResourceConfigId       OPTIONAL,   -- Need R
    nzp-CSI-RS-ResourcesForInterference     CSI-ResourceConfigId       OPTIONAL,   -- Need R

[..................]

reportQuantity                          CHOICE {
        none                                    NULL,
        cri-RI-PMI-CQI                          NULL,
        cri-RI-i1                               NULL,
        cri-RI-i1-CQI                           SEQUENCE {
            pdsch-BundleSizeForCSI                  ENUMERATED (n2, n4)    OPTIONAL    -- Need S
        },
        cri-RI-CQI                              NULL,
        cri-RSRP                                NULL,
        ssb-Index-RSRP                          NULL,
        cri-RI-LI-PMI-CQI                       NULL,
        cri-AII                                 NULL,
        AII                                     NULL
    },
                                            [..................]
}

-- TAG-CSI-REPORTCONFIG-STOP
-- ASN1STOP
```

```
-- ASN1START
-- TAG-AI-CONFIG-START

AI-Config ::=                   SEQUENCE {
    ConfigId                        AI-ConfigId
    scheme                          ENUMERATED {RNN, CNN, MNN}
    regularization                  ENUMERATED {L1, L2, Dropout}
    numLayers                       ENUMERATED {1,2,3,4},
    numInnerNodes                   ENUMERATED {1,2,3,4,5,6,7,8},
    numOutputNodes                  ENUMERATED {1,2,3,4,5,6},
    numNodesPerInnerLayer           ENUMERATED {1,2,3,4,5,6,7,8,9,10},
    scheme                          ENUMERATED {beamManagement, CSI-spatial, CSI-frequency,
                                    CSI-prediction, CSI-RS-reduction},
    activationFunction              ENUMERATED {Sigmoid1, Sigmoid2, ReLU, ArcTan}
}

-- TAG-AI-CONFIG-STOP
-- ASN1STOP
```

FIG. 9

CONFIGURING AN ARTIFICIAL INTELLIGENCE BASED FRAMEWORK

FIELD

The subject matter disclosed herein relates generally to wireless communications and more particularly relates to configuring an artificial intelligence based framework.

BACKGROUND

In certain wireless communications networks, artificial intelligence may be used corresponding to channel state information measurement and/or reporting. In such networks, the artificial intelligence may need to be configured.

BRIEF SUMMARY

Methods for configuring an artificial intelligence based framework are disclosed. Apparatuses and systems also perform the functions of the methods. One embodiment of a method includes receiving, at a user equipment, a first indication indicating an artificial intelligence based framework. In some embodiments, the method includes receiving configuration information corresponding to channel state information report settings. The configuration information includes channel state information reference signals to be received at the user equipment; the channel state information reference signals are transmitted over at least one frequency index, at least one spatial index, at least one temporal index, or some combination thereof; and the channel state information reference signals are decomposed into two groups based on the at least one frequency index, the at least one spatial index, the at least one temporal index, or some combination thereof. In certain embodiments, the method includes generating first channel state information based on a first group of the two groups of channel state information reference signals. In various embodiments, the method includes transmitting a channel state information report including at least the first channel state information. In some embodiments, the method includes communicating an artificial intelligence based report corresponding to second channel state information corresponding to a second group of the two groups of channel state information reference signals. The artificial intelligence based report for channel state information includes a correlation between the first channel state information and the second channel state information.

One apparatus for configuring an artificial intelligence based framework includes a user equipment. In some embodiments, the apparatus includes a receiver that: receives a first indication indicating an artificial intelligence based framework; and receives configuration information corresponding to channel state information report settings. The configuration information includes channel state information reference signals to be received at the user equipment; the channel state information reference signals are transmitted over at least one frequency index, at least one spatial index, at least one temporal index, or some combination thereof; and the channel state information reference signals are decomposed into two groups based on the at least one frequency index, the at least one spatial index, the at least one temporal index, or some combination thereof. In various embodiments, the apparatus includes a processor that generates first channel state information based on a first group of the two groups of channel state information reference signals. In certain embodiments, the apparatus includes a transmitter that: transmits a channel state information report including at least the first channel state information; and communicates an artificial intelligence based report corresponding to second channel state information corresponding to a second group of the two groups of channel state information reference signals. The artificial intelligence based report for channel state information includes a correlation between the first channel state information and the second channel state information.

Another embodiment of a method for configuring an artificial intelligence based framework includes transmitting, from a network device, a first indication indicating an artificial intelligence based framework. In some embodiments, the method includes transmitting configuration information corresponding to channel state information report settings. The configuration information includes channel state information reference signals to be received at the user equipment; the channel state information reference signals are transmitted over at least one frequency index, at least one spatial index, at least one temporal index, or some combination thereof; and the channel state information reference signals are decomposed into two groups based on the at least one frequency index, the at least one spatial index, the at least one temporal index, or some combination thereof. In certain embodiments, the method includes receiving a channel state information report comprising first channel state information. The first channel state information is generated based on a first group of the two groups of channel state information reference signals. In various embodiments, the method includes receiving an artificial intelligence based report corresponding to second channel state information corresponding to a second group of the two groups of channel state information reference signals. The artificial intelligence based report for channel state information includes a correlation between the first channel state information and the second channel state information.

Another apparatus for configuring an artificial intelligence based framework includes a network device. In some embodiments, the apparatus includes a transmitter that: transmits a first indication indicating an artificial intelligence based framework; and transmits configuration information corresponding to channel state information report settings. The configuration information includes channel state information reference signals to be received at the user equipment; the channel state information reference signals are transmitted over at least one frequency index, at least one spatial index, at least one temporal index, or some combination thereof; and the channel state information reference signals are decomposed into two groups based on the at least one frequency index, the at least one spatial index, the at least one temporal index, or some combination thereof. In various embodiments, the apparatus includes a receiver that: receives a channel state information report comprising first channel state information, wherein the first channel state information is generated based on a first group of the two groups of channel state information reference signals; and receives an artificial intelligence based report corresponding to second channel state information corresponding to a second group of the two groups of channel state information reference signals. The artificial intelligence based report for channel state information includes a correlation between the first channel state information and the second channel state information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a schematic block diagram illustrating one embodiment of the first embodiment of the first set of embodiments for ASN.1 code for a CSI-ReportConfig reporting setting IE with multi-TRP transmission indication;

FIG. 6 is a schematic block diagram illustrating one embodiment of the second embodiment of the first set of embodiments for ASN.1 code for a CSI-ReportConfig reporting setting IE with multi-TRP transmission indication;

FIG. 7 is a schematic block diagram illustrating one embodiment of the third embodiment of the first set of embodiments for ASN.1 code for triggering a codebook configuration corresponding to AI based CSI framework within CodebookConfig codebook configuration IE;

FIG. 8 is a schematic block diagram illustrating one embodiment of the fourth embodiment of the first set of embodiments for ASN.1 code for triggering two CSI reports within a CSI-ReportConfig reporting setting IE;

FIG. 9 is a schematic block diagram illustrating one embodiment of the twelfth embodiment of the second set of embodiments for ASN.1 code for a CSI-ReportConfig reporting setting IE with multi-TRP transmission indication;

DETAILED DESCRIPTION

Figure 1:
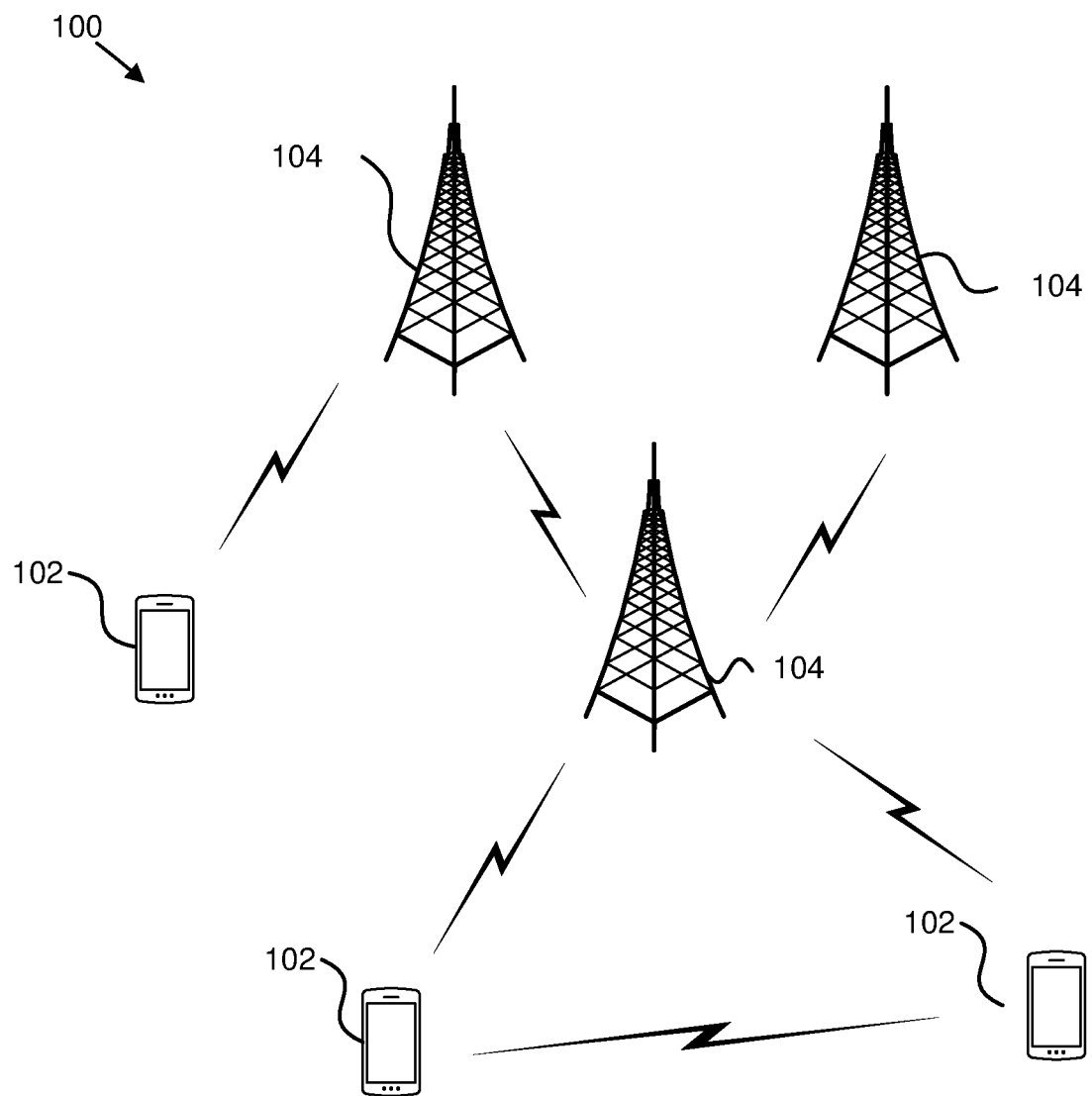
FIG. 1 is a schematic block diagram illustrating one embodiment of a wireless communication system for configuring an artificial intelligence based framework.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring an artificial intelligence based framework. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive, at a user equipment, a first indication indicating an artificial intelligence based framework. In some embodiments, the remote unit 102 may receive configuration information corresponding to channel state information report settings. The configuration information includes channel state information reference signals to be received at the user equipment; the channel state information reference signals are transmitted over at least one frequency index, at least one spatial index, at least one temporal index, or some combination thereof; and the channel state information reference signals are decomposed into two groups based on the at least one frequency index, the at least one spatial index, the at least one temporal index, or some combination thereof. In certain embodiments, the remote unit 102 may generate first channel state information based on a first group of the two groups of channel state information reference signals. In various embodiments, the remote unit 102 may transmit a channel state information report including at least the first channel state information. In some embodiments, the remote unit 102 may communicate an artificial intelligence based report corresponding to second channel state information corresponding to a second group of the two groups of channel state information reference signals. The artificial intelligence based report for channel state information includes a correlation between the first channel state information and the second channel state information. Accordingly, the remote unit 102 may be used for configuring an artificial intelligence based framework.

In certain embodiments, a network unit 104 may transmit a first indication indicating an artificial intelligence based framework. In some embodiments, the network unit 104 may transmit configuration information corresponding to channel state information report settings. The configuration information includes channel state information reference signals to be received at the user equipment; the channel state information reference signals are transmitted over at least one frequency index, at least one spatial index, at least one temporal index, or some combination thereof; and the channel state information reference signals are decomposed into two groups based on the at least one frequency index, the at least one spatial index, the at least one temporal index, or some combination thereof. In certain embodiments, the network unit 104 may receive a channel state information report comprising first channel state information. The first channel state information is generated based on a first group of the two groups of channel state information reference signals. In various embodiments, the network unit 104 may receive an artificial intelligence based report corresponding to second channel state information corresponding to a second group of the two groups of channel state information reference signals. The artificial intelligence based report for channel state information includes a correlation between the first channel state information and the second channel state information. Accordingly, the network unit 104 may be used for configuring an artificial intelligence based framework.

Figure 2:
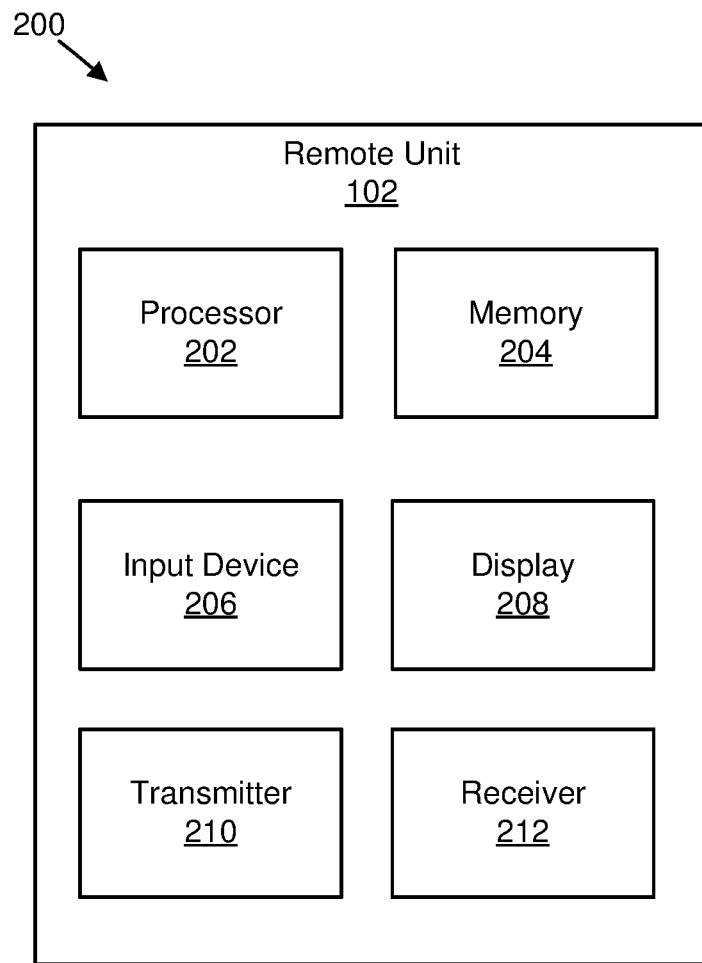
FIG. 2 is a schematic block diagram illustrating one embodiment of an apparatus that may be used for configuring an artificial intelligence based framework.

FIG. 2 depicts one embodiment of an apparatus 200 that may be used for configuring an artificial intelligence based framework. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212: receives a first indication indicating an artificial intelligence based framework; and receives configuration information corresponding to channel state information report settings. The configuration information includes channel state information reference signals to be received at the user equipment; the channel state information reference signals are transmitted over at least one frequency index, at least one spatial index, at least one temporal index, or some combination thereof; and the channel state information reference signals are decomposed into two groups based on the at least one frequency index, the at least one spatial index, the at least one temporal index, or some combination thereof. In various embodiments, the processor 202 generates first channel state information based on a first group of the two groups of channel state information reference signals. In certain embodiments, the transmitter 210: transmits a channel state information report including at least the first channel state information; and communicates an artificial intelligence based report corresponding to second channel state information corresponding to a second group of the two groups of channel state information reference signals. The artificial intelligence based report for channel state information includes a correlation between the first channel state information and the second channel state information.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
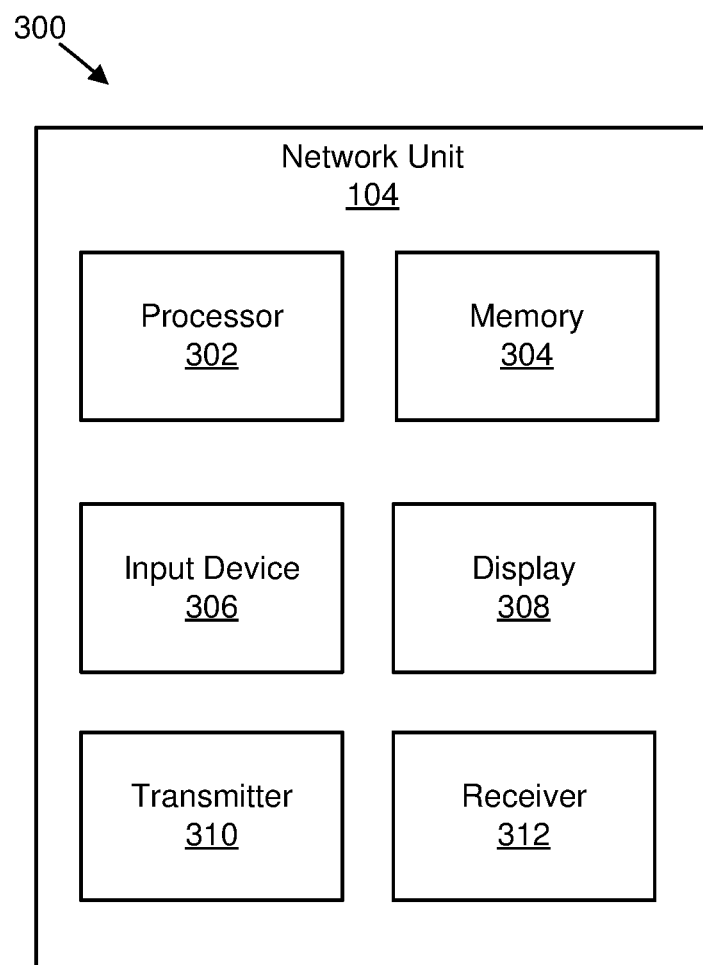
FIG. 3 is a schematic block diagram illustrating one embodiment of an apparatus that may be used for configuring an artificial intelligence based framework.

FIG. 3 depicts one embodiment of an apparatus 300 that may be used for configuring an artificial intelligence based framework. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310: transmits a first indication indicating an artificial intelligence based framework; and transmits configuration information corresponding to channel state information report settings. The configuration information includes channel state information reference signals to be received at the user equipment; the channel state information reference signals are transmitted over at least one frequency index, at least one spatial index, at least one temporal index, or some combination thereof; and the channel state information reference signals are decomposed into two groups based on the at least one frequency index, the at least one spatial index, the at least one temporal index, or some combination thereof. In various embodiments, the receiver 312: receives a channel state information report comprising first channel state information, wherein the first channel state information is generated based on a first group of the two groups of channel state information reference signals; and receives an artificial intelligence based report corresponding to second channel state information corresponding to a second group of the two groups of channel state information reference signals. The artificial intelligence based report for channel state information includes a correlation between the first channel state information and the second channel state information.

In certain embodiments, such as for 3GPP new radio ("NR"), channel state information ("CSI") feedback may be reported by a user equipment ("UE") to a network. The CSI feedback may take multiple forms based on a CSI feedback report size, time, and/or frequency granularity. In some embodiments, such as in NR, a high-resolution CSI feedback report (e.g., Type-II) may be used. In such embodiments, spatial and frequency granularities of CSI feedback may be parametrized by the network using a variable number of spatial domain basis indices and frequency domain basis indices. In various embodiments, scenarios in which a UE speed is relatively high (e.g., up to 500 km/h) may exist for high-speed train scenarios. To optimize a tradeoff between a performance and CSI feedback overhead, certain frameworks for CSI measurement and reporting may be made.

In some embodiments, artificial intelligence ("AI") based CSI measurement and reporting frameworks may be made with the aim of using benefits of the AI algorithms to achieve higher throughput, enhanced reliability, reduced signaling overhead, and/or lower CSI feedback. In various embodiments, such as for AI based CSI framework, enhancements in the form of precoder matrix indicator ("PMI") prediction, rank indicator ("RI") prediction, channel quality indicator ("CQI") prediction, spatial domain compression, frequency domain compression, and/or CSI-RS compression may all be possible.

In certain embodiments, AI based CSI measurement and reporting may be used. In some embodiments, AI based CSI may be generated based on the following general steps: 1) CSI reference signal ("RS") ("CSI-RS") decomposition into two CSI-RS groups based on spatial dimensions, frequency dimensions, and/or temporal dimensions; 2) CSI generation for resources corresponding to a first of the two CSI-RS groups; 3) AI based CSI generation for resources corresponding to a second of the two CSI-RS groups, wherein the input of the AI based process is the CSI corresponding to the first of the two CSI-RS group, and the AI based transfer function is in a form of a correlation between CSI corresponding to the first of the two CSI-RS groups with the CSI corresponding to the second of the two CSI-RS groups; and/or 4) the UE is configured with receiving CSI-RS corresponding to the first of the two CSI-RS groups only, wherein the UE computes CSI for resources corresponding to the first of the two CSI-RS groups based in the received CSI-RS, and the UE computes CSI for resources corresponding to the second of the two CSI-RS groups based on an AI based transfer function.

In other embodiments, there may be three levels of coordination between a device and a network node, as follows: 1) AI level coordination between the device and the network node (e.g., both nodes exchange information corresponding to an NN model and/or AI based parameters); 2) channel correlation level coordination between the device and the network node (e.g., both nodes exchange information corresponding to a channel correlation in at least one of time, frequency, and/or space—the exchanged information may correspond to some parameters related to an NN model or AI-based parameters; however, the NN model or AI algorithm remain implicit with respect to signaling between both nodes); and/or 3) validation level coordination between the device and the network node (e.g., both nodes exchange information corresponding to the channel quality with AI based CSI feedback compared with conventional CSI feedback).

Several embodiments are described herein. In some embodiments, one or more elements or features from one or more of the described embodiments may be combined (e.g., for CSI measurement, feedback generation, and/or reporting which may reduce an overall CSI feedback overhead).

It should be noted that a transmission and reception point ("TRP") may include one or more TRPs, one or more cells, one or more nodes, one or more panels, communication (e.g., signals and/or channels) associated with a control resource set ("CORESET") pool, and/or a communication associated with a transmission configuration indicator ("TCI") state from a transmission configuration.

Moreover, unless otherwise explicitly stated, embodiments herein may be generic with respect to machine learning ("ML") type, a ML scheme, an AI scheme, a neural network ("NN") scheme, a training method, a learning mode, and/or an integration type. Further, the term UE may refer to a phone device, a relay node, an integrated access backhaul ("IAB") node, an internet of things ("IoT") device, and/or a customer precise equipment ("CPE") node. In addition, the term "CSI framework" may refer to CSI triggering, CSI resource setting, CSI measurement, CSI reporting setting, and/or CSI feedback reporting.

Figure 4:
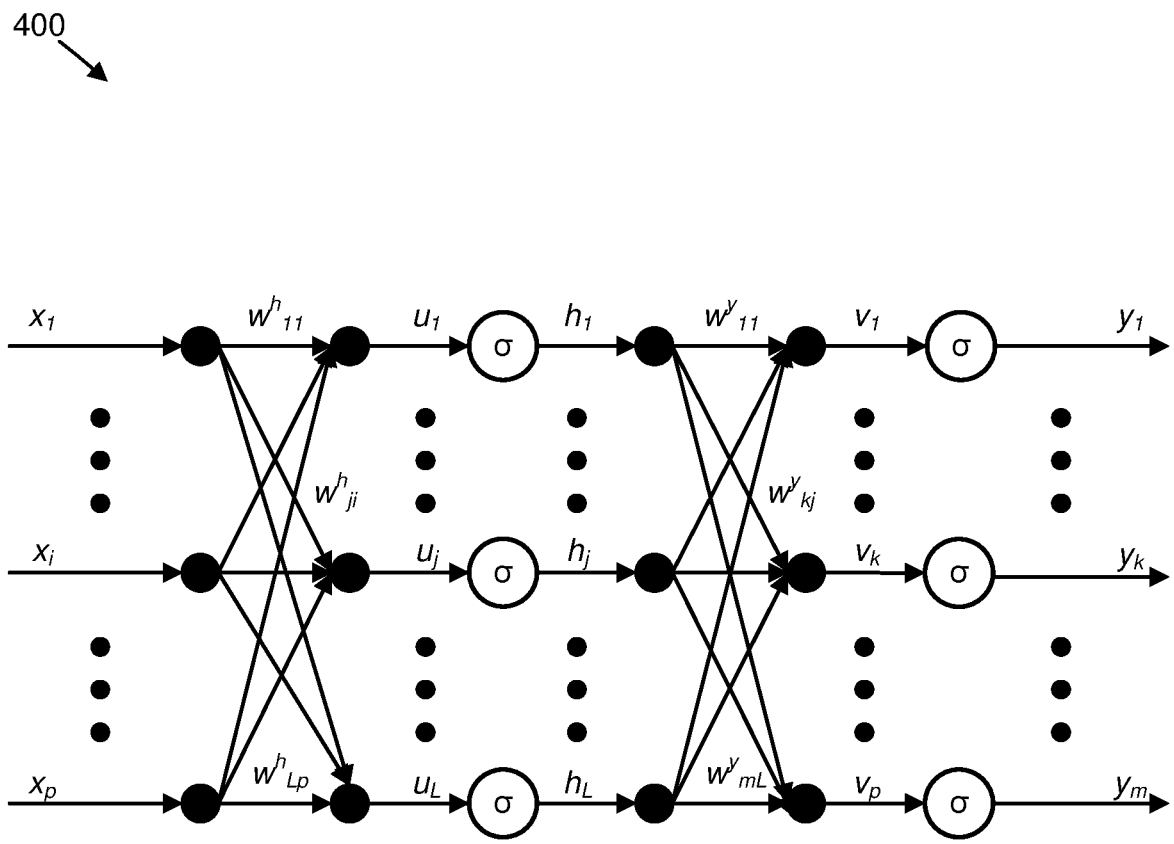
FIG. 4 is a schematic block diagram illustrating one embodiment of a system including a neural network for CSI feedback.

In various embodiments, a neural network includes an input layer, an output layer, and at least one inner and/or hidden layer. In such an embodiment, each layer includes several nodes. One embodiment of a neural network, within the context of CSI feedback, is shown in FIG. 4. Specifically, FIG. 4 is a schematic block diagram illustrating one embodiment of a system 400 including a neural network for CSI feedback. An input layer includes p nodes x (e.g., input values, compressed CSI feedback), an output layer includes m nodes y (e.g., output values, decompressed CSI feedback), and each of the hidden layers include L nodes u and h. An activation function is applied per edge, wherein a Sigmoid function is used.

In certain embodiments, there may be a CSI reporting configuration and feedback for multi-TRP. In such embodiments, a UE is configured by higher layers with one or more CSI-ReportConfig reporting settings for CSI reporting, one or more CSI-ResourceConfig resource settings for CSI measurement, and one or two lists of trigger states (e.g., given by the higher layer parameters CSI-AperiodicTriggerStateList and CSI-SemiPersistentOnPUSCH-TriggerStateList). Each trigger state in CSI-AperiodicTriggerStateList may contain a list of a subset of the associated CSI-ReportConfigs indicating the resource set identifiers ("IDs") for channel and/or for interference. Each trigger state in CSI-SemiPersistentOnPUSCH-TriggerStateList may contain one or more associated CSI-ReportConfig. Different embodiments for AI based CSI framework are found herein. An arrangement having a combination of one or more embodiments described herein is not precluded.

In a first set of embodiments, there may be an indication of AI based CSI framework. Different embodiments for indication of AI based CSI framework are found herein. An arrangement having a combination of one or more embodiments described herein is not precluded.

In a first embodiment of the first set of embodiments, a UE configured with AI based CSI framework may be configured with at least one CSI reporting setting (e.g., CSI-ReportConfig). The at least one CSI reporting setting includes a higher-layer parameter (e.g., AI-CSI-Enabled) that configures the UE for AI based CSI measurement and/or reporting. An example of the abstract syntax notation 1 ("ASN.1") code that corresponds to a CSI reporting setting information element ("IE") is shown in FIG. 5, with a higher-layer parameter that triggers AI based CSI framework. Specifically, FIG. 5 is a schematic block diagram illustrating one embodiment of the first embodiment of the first set of embodiments for ASN.1 code 500 for a CSI-ReportConfig reporting setting IE with multi-TRP transmission indication.

In a second embodiment of the first set of embodiments, a UE configured with AI based CSI framework may be configured with an AI based configuration IE (e.g., AI-Config) that configures the UE for AI based measurement and/or feedback reporting of AI, NN, and/or ML related parameters. The AI based configuration IE may be configured within a CSI reporting setting IE (e.g., CSI-ReportConfig IE may be the parent IE of an AI config IE). In another embodiment of the first set of embodiments, a CSI reporting setting IE may be configured within an AI based configuration IE (e.g., AI config IE may be the parent of CSI-ReportConfig IE). An example of the ASN.1 code that corresponds to a CSI Reporting setting IE is shown in FIG. 6, with a higher-layer parameter that triggers AI based CSI framework. Specifically, FIG. 6 is a schematic block diagram illustrating one embodiment of the second embodiment of the first set of embodiments for ASN.1 code 600 for a CSI-ReportConfig reporting setting IE with multi-TRP transmission indication.

In a third embodiment of the first set of embodiments, a UE configured with multi-TRP transmission may be configured with one or more CSI reporting setting (e.g., CSI-ReportConfig). The one or more CSI reporting setting (e.g., CSI-ReportConfig) configures a codebook configuration (e.g., CodebookConfig) with a codebook type that corresponds to AI based CSI framework. In one example, a new codebook configuration for Rel. 19 (e.g., CodebookConfig-r19) is supported, where a Type-3 codebook type is used (e.g., the higher-layer parameter codebook Type set to "type3"), and wherein a sub-type of the codebook type is set to "typeIII-r19". An example of the ASN. 1 code that corresponds to the CSI-ReportConfig reporting setting IE is shown in FIG. 7, wherein a codebook configuration corresponding to AI based CSI framework is triggered under the same reporting setting. Specifically, FIG. 7 is a schematic block diagram illustrating one embodiment of the third embodiment of the first set of embodiments for ASN.1 code 700 for triggering a codebook configuration corresponding to AI based CSI framework within CodebookConfig codebook configuration IE.

In a fourth embodiment of the first set of embodiments, a UE configured with AI based CSI framework may be configured with one or more CSI reporting setting (e.g., CSI-ReportConfig). The at least one of the one or more CSI reporting setting (e.g., CSI-ReportConfig) configures a report quantity (e.g., reportQuantity) that includes an AI based parameter reporting (e.g., a new indicator for artificial intelligence indicator ("AII")) is used to set reporting. An example of the ASN.1 code that corresponds to the CSI-ReportConfig reporting setting IE is shown in FIG. 8. Specifically, FIG. 8 is a schematic block diagram illustrating one embodiment of the fourth embodiment of the first set of embodiments for ASN.1 800 code for triggering two CSI reports within a CSI-ReportConfig reporting setting IE.

In a fifth embodiment of the first set of embodiments, a UE configured with AI based CSI framework may be configured with one or more CSI reporting setting (e.g., CSI-ReportConfig). At least one of the one or more CSI reporting setting (e.g., CSI-ReportConfig) configures a report quantity (e.g., reportQuantity) that is set to 'none'.

In a sixth embodiment of the first set of embodiments, a UE configured with AI based CSI framework may be indicated via downlink control information ("DCI") signaling for scheduling physical downlink shared channel ("PDSCH") and/or a physical uplink shared channel ("PUSCH"). In a first example, AI based CSI framework is indicated via an additional field in DCI format 1_2 for PDSCH scheduling. In a second example, AI based CSI framework is indicated via an additional field in DCI format 0_2 for PUSCH scheduling.

In a seventh embodiment of the first set of embodiments, a UE configured with AI based CSI framework may be indicated via medium-access-control ("MAC") control element ("CE") signaling.

A second set of embodiments may include a CSI reporting configuration under an AI based CSI framework. In such embodiments, a UE may be configured with a CSI reporting setting (e.g., CSI-ReportConfig) that triggers CSI measurement and/or reporting using AI based framework. Different parameters corresponding to AI based CSI framework may be present in the CSI reporting setting. Different embodiments of these parameters are found in different embodiments herein. A setup with a combination of one or more embodiments found herein may be made.

In a first embodiment of the second set of embodiments, a parameter corresponding to an AI scheme and/or a NN scheme (e.g., scheme) is included in an AI configuration. In one example, the AI training scheme may take on some values corresponding to a convolutional neural network ("CNN"), recurrent neural network ("RNN"), and/or a modular neural network ("MNN") (e.g., a parameter scheme may be set to CNN, RNN, or MNN).

In a second embodiment of the second set of embodiments, a parameter corresponding to a number of nodes, inputs, and/or input nodes (e.g., numNodes) in a neural network may be assumed in an AI based CSI framework and may be included in an AI configuration.

In a third embodiment of the second set of embodiments, a parameter corresponding to a depth or a number of layers (e.g., numLayers) in a neural network may be assumed in an AI based CSI framework and may be included in an AI configuration. In a first example, a number of layers parameter only corresponds to inner layers. In a second example, a number of layers parameter includes input and output layers.

In a fourth embodiment of the second set of embodiments, a parameter corresponding to a number of neurons and/or nodes per inner and/or hidden layer (e.g., numNodesPerInnerLayers) in a neural network may be assumed in an AI based CSI framework to be included in an AI configuration.

In a fifth embodiment of the second set of embodiments, a parameter corresponding to a number of nodes per input layer (e.g., numInputNodes) in a neural network may be assumed in an AI based CSI framework to be included in an AI configuration.

In a sixth embodiment of the second set of embodiments, a parameter corresponding to a number of nodes per output layer (e.g., numOutputNodes) in the neural network may be assumed in an AI based CSI framework to be included in an AI configuration.

In a seventh embodiment of the second set of embodiments, a parameter corresponding to an activation function used in the NN model (e.g., activationFunction) may be included in an AI configuration. In one example, an NN activation function may take on some values corresponding to a first sigmoid function ("Sigmoid1"), a second sigmoid function ("Sigmoid2"), a rectified linear unit ("ReLU"), or arc tangent ("ArcTan") function (e.g., a parameter activationFunction may be set to one of Sigmoid1, Sigmoid2, ReLU, or ArcTan included in an AI configuration).

In an eighth embodiment of the second set of embodiments, a parameter corresponding to a regularization technique used in an NN model (e.g., regularization) may be included in an AI configuration. In a first example, if a regularization parameter is set to enabled, a UE applies an overfitting technique. In a second example, a regularization parameter may take on multiple values corresponding to a regularization technique including a Lasso regression ("L1") regularization technique, a Ridge regression ("L2") technique, or a dropout technique (e.g., a parameter regularization may be set to L1, L2, or dropout) included in an AI configuration.

In a ninth embodiment of the second set of embodiments, a parameter corresponding to a maximum number of edges whose weights can be reported (e.g., maxEdges) in a neural network may be assumed in an AI based CSI framework to be included in an AI configuration.

In a tenth embodiment of the second set of embodiments, an AI scheme, an NN scheme, a number of nodes, a number of layers, a number of nodes per inner layer, a number of input nodes, a number of output nodes, and/or an activation function may be aggregated to one parameter. In one example, a parameter corresponding to an NN structure may correspond to a joint value of two or more of a number of layers, a number of input nodes, a number of output nodes, and/or a number of nodes per inner layer.

In an eleventh embodiment of the second set of embodiments, AI configuration parameters are preconfigured or fixed for a given scheme. In one example, if an AI enabled CSI prediction is configured and/or indicated to a UE, the UE may apply AI configuration parameters based on a first pre-configuration of two pre-configurations. If an AI enabled beam management is configured and/or indicated to a UE, the UE may apply AI configuration parameters based on a second pre-configuration of the two pre-configurations.

In a twelfth embodiment of the second set of embodiments, AI configuration parameters are dependent on a priority level associated with CSI processing. In one example, if a priority level is high, such as for ultra-reliable low-latency communication ("URLLC") traffic associated CSI, a first set of two sets of AI configuration parameters are applied. For low priority traffic such as enhanced mobile broadband ("eMBB") traffic, a second of two sets of AI configuration parameters may be applied.

An example of ASN. 1 code that corresponds to an AI configuration IE (e.g., AI-Config) is shown in FIG. 9 (e.g., a subset of parameters of an IE may be configured). Specifically, FIG. 9 is a schematic block diagram illustrating one embodiment of the twelfth embodiment of the second set of embodiments for ASN.1 code 900 for a CSI-ReportConfig reporting setting IE with multi-TRP transmission indication.

In a third set of embodiments, there may be AI based reporting parameters. In such embodiments, a UE may be configured with a CSI reporting setting (e.g., CSI-ReportConfig) that triggers CSI reporting based on an AI framework. Different embodiments that address an AI configuration are provided herein. Moreover, a setup with a combination of one or more embodiments herein may be made.

In a first embodiment of the third set of embodiments, a UE receives an AI configuration that configures the UE for reporting AI based CSI parameters. The AI configuration includes values corresponding to parameters related to a number of inner and/or hidden layers, a number of input nodes, a number of output nodes, a number of nodes per inner layer, a weight per edge between two nodes in consecutive layers, and/or a bias per node. In a first example, an indication of edges with non-zero weights and/or nodes with non-zero biases may be indicated via a bitmap or with one bit corresponding to each edge or node (e.g., an edge with a corresponding value 1 has a non-zero edge weight that is reported). An edge with a corresponding value 0 has a zero edge weight and is not reported. In a second example, an indication of edges with non-zero weights and/or nodes with non-zero biases is indicated via a combinatorial value. The combinatorial value may be in a form of an nChoosek (n,k) function, wherein:

$$nChoosek(n, k) = \frac{n!}{(n-k)! \cdot k!}$$

and n! represents a factorial function (e.g., n!=n. (n−1) . . . 2.1), where n corresponds to a number of all possible edges, and k corresponds to a selected subset of edges with non-zero weight from the set of the n possible edges.

In a second embodiment of the third set of embodiments, values of one or more of the parameters in an AI report are selected from a codebook of values per parameter, a codebook of sequence of values per parameter group, and/or a codebook of values for a sequence of all parameters. The parameters may be reported in an uncoded manner, or via a simple mapping per parameter, parameter group, and/or sequence, or may be coded using a compression coding scheme (e.g., arithmetic coding or Huffman coding). In one example, a bitmap corresponding to indices of edges with non-zero weights may be encoded using arithmetic coding.

In a third embodiment of the third set of embodiments, parameters corresponding to an AI report are selected from a table of values out of multiple tables of values. In one example, a first set of two sets of bits indicating a table of values out of a plurality of tables of values, and a second set of the two sets of bits indicating a value in the indicated table of values of the plurality of tables of values are reported. In another example, multiple codebooks of amplitude values corresponding to a set of output nodes exist, wherein an AI report includes an indication of a selected codebook of amplitude values from the multiple codebooks of amplitude values in addition to an indication of a value within the selected codebook of amplitude values.

In a fourth embodiment of the third set of embodiments, parameters corresponding to an AI report may be reported based on a fixed point representation and/or a floating point representation. In one example, a parameter that indicates a number of fractional values (e.g., values smaller than one and/or a number of integer values) for one or more reported parameters may be reported.

In a fifth embodiment of the third set of embodiments, output nodes may correspond to a function of one or more channel parameters corresponding to a number of paths, angles of arrival, departure per path, delays per path, channel amplitude value per path, channel phase per path, user position, velocity per path, Doppler shift, Doppler spread, average delay, and/or delay spread.

In a sixth embodiment of the third set of embodiments, an AI based report may include an indication of a subset of CSI-RS ports from a set of configured CSI-RS ports, a subset of frequency sub-bands from a set of frequency sub-bands, a subset of time slots from a set of time slots, a subset of frequency bands from a set of frequency bands, a subset of CSI-RS resources from a set of CSI-RS resources, a subset of spatial basis indices from a set of spatial basis indices, and/or a subset of frequency basis indices from a set of frequency basis indices.

In a seventh embodiment of the third set of embodiments, an AI based report may include at least one CQI assuming AI based CSI.

In an eighth embodiment of the third set of embodiments, an AI based report may include an indication of a subset of layers from a set of configured layers, an indication of a subset of nodes per layer from a set of configured nodes per layer, an indication of a subset of weights per edge from a set of configured weights per edge, and/or an indication of a subset of biases per nodes from a set of biases per node. The values corresponding to an indicated subset is either activated or updated. In one example, an AI report may include an indication of indices of K' activated, updated, and/or varying nodes out of K nodes in a given layer, wherein K'≤ K.

In a fourth set of embodiments, there may be an AI reporting classification.

In a first embodiment of the fourth set of embodiments, an AI report corresponds to a new class of reports corresponding to an AI configuration (e.g., AI-Config).

In a second embodiment of the fourth set of embodiments, an AI report corresponds to a new type of CSI report (e.g., Type-III CSI report).

In a third embodiment of the fourth set of embodiments, an AI report includes a type and/or sub-type with respect to usage (e.g., CSI, beam management, positioning, demodulation reference signal ("DMRS") compression, and/or network optimization).

In a fourth embodiment of the fourth set of embodiments, an AI report corresponding to a type set to CSI includes a sub-type with respect to CSI prediction, CSI-RS compression, CSI frequency compression, and/or CSI beam compression.

In a fifth embodiment of the fourth set of embodiments, an AI report corresponding to a type set to 'beamManagement' includes a sub-type with respect to prediction and/or SSB compression.

In a sixth embodiment of the fourth set of embodiments, an AI based report may be configured periodically (e.g., configured every x slots, where x is a positive integer value), aperiodically (e.g., indicated by DCI signaling), or semi-persistently (e.g., transmitted in a periodic manner based on an activation command and stopped based on a deactivation command).

In a seventh embodiment of the fourth set of embodiments, an AI based report may include a minimum guaranteed accuracy of a CSI report that is inferred by applying AI. In one implementation, a UE may trigger a network to retain, calibrate, and/or update an AI model according to a pre-configured threshold (e.g., CQI value) or if a minimum guaranteed accuracy is below a certain pre-configured threshold.

In an eighth embodiment of the fourth set of embodiments, AI parameters are fed back from a network to a UE via a higher layer configuration, MAC CE, via downlink control information over physical downlink control channel ("PDCCH") via a DCI format that supports AI triggering, and/or a second stage DCI of a current DCI format.

In a ninth embodiment of the fourth set of embodiments, AI parameters are fed back from a UE to a network via uplink control information transmitted on PUSCH and/or physical uplink control channel ("PUCCH"). The feedback may be part of a CSI report (e.g., Type III) or a new report type corresponding to an AI configuration (e.g., AI based report with type set to CSI).

In a tenth embodiment of the fourth set of embodiments, an AI configuration is associated with a CSI reporting setting that configures a UE for interference measurement only (e.g., using one or more non-zero-power ("NZP") CSI-RS resources for interference management, or using a CSI interference measurement ("IM") ("CSI-IM"). In various embodiments, one or more parameters related to AI based reporting or CSI reporting configuration are reported with interference related information fed back to a network via an interference management framework.

In a fifth set of embodiments, there may be an AI based CSI processing and computation time.

In a first embodiment of the fifth set of embodiments, a UE cannot support two simultaneous AI based reports in a component carrier.

In a second embodiment of the fifth set of embodiments, a UE cannot support two simultaneous AI based reports across all component carriers.

In a third embodiment of the fifth set of embodiments, a UE indicates a number of supported simultaneous AI based reports (e.g., Mcpu) with a higher layer parameter for simultaneous AI based reports per component carrier (e.g., simultaneousAI-CSI-ReportsPerCC) reported in an IE for multiple-input multiple-output ("MIMO") parameters per band (e.g., MIMO-ParametersPerBand).

In a fourth embodiment of the fifth set of embodiments, a UE indicates a number of supported simultaneous AI-based reports (e.g., Mcpu) with a higher-layer parameter for simultaneous AI based CSI reports for all component carriers (e.g., simultaneousAI-CSI-ReportsAllCC) reported in an IE for carrier aggregation parameters in NR (e.g., CA-ParametersNR).

In a fifth embodiment of the fifth set of embodiments, an AI based report computation time is configured or set by a rule. A UE may provide a valid AI report, an AI based report at least after x symbols from receiving a triggering of the AI report, and/or or the AI based report.

In a sixth embodiment of the fifth set of embodiments, an AI based report computation time is configured or set by a rule. A UE may provide a valid AI report, an AI based report at most within x symbols from receiving a triggering of the AI report, and/or the AI-based report.

In a seventh embodiment of the fifth set of embodiments, a separate CSI computation delay requirement is configured for AI enabled CSI processing that may be different than a conventional CSI computation delay requirement 1 and requirement 2. For example, a CSI computation delay requirement 3 is defined for AI enabled CSI processing.

In a sixth set of embodiments, there may be AI based CSI framework algorithms.

In a first implementation of the sixth set of embodiments, all AI based calculations may be pursued at a UE side. The network configures the UE with a CSI resource setting including a CSI-RS configuration transmitted to the UE on time (e.g., represented by symbols, slots, and/or periodicity), frequency (e.g., represented by a resource element ("RE"), resource block ("RB"), PMI sub-band, and/or CQI sub-band), and/or space (e.g., represented by CSI-RS ports). The UE feeds back a CSI report corresponding to a subset of the CSI-RS symbols, REs, and/or ports. The CSI report includes some AI based parameters (e.g., NN parameters such as number of layers, nodes, weights and biases of edges and nodes) transmitted to the network via uplink control information ("UCI") signaling on a PUSCH and/or a PUCCH. The UE may report an indicator corresponding to CSI-RS time, frequency, and/or port indices that are used as a reference and/or input for an NN model. In certain embodiments, a UE may be configured with CSI-RS time, frequency, and/or port indices that are used as a reference and/or input for an NN model.

In certain embodiments, a UE may feed back a CSI report, wherein the CSI report includes a first CQI corresponding to an AI based channel estimate using a subset of CSI-RS symbols, REs, and/or ports in conjunction with an output of an NN model, in addition to a second CQI corresponding to a conventional channel based on a CSI-RS configuration. Based on the fed back CQIs, the network may compare a quality of AI based CSI feedback compared with traditional CSI feedback.

In an alternative embodiment of the sixth set of embodiments, a UE reports delta and/or differential changes for AI based parameters (e.g., NN model parameters) fed back in prior feedback occurrences.

In a second implementation of the sixth set of embodiments, all AI based calculations are pursued at a network side. The network configures a UE with a CSI resource setting including a CSI-RS configuration to the UE on at least time (e.g., represented by symbols, slots, periodicity), frequency (e.g., represented by RE, RB, PMI sub-band, CQI sub-band), and/or space (e.g., represented by CSI-RS ports). The UE feeds back a CSI report corresponding to a first CSI-RS configuration. Based on the CSI report, the network reports some channel based parameters to the UE. The aforementioned steps may be pursued in instances in which the network has low load, or the UE is not scheduled with PDSCH reception and/or PUSCH transmission.

In a first example, the network reports some AI based parameters (e.g., NN parameters such as number of layers, nodes, weights and biases of edges and nodes) to the UE via higher-layer signaling, MAC CE, and/or a second stage DCI.

In a second example, a network reports some channel correlation parameters (e.g., spatial, frequency, and/or temporal channel correlation function parameters) to a UE via higher-layer signaling, MAC CE, and/or a second stage DCI.

In a third example, a network reports delta and/or differential changes to AI based parameters (e.g., NN model parameters) fed back in prior transmission occurrences.

Based on fed back parameters that may enable a UE to estimate some frequency, time, and/or spatial correlation of a channel, a network may configure the UE with a second CSI-RS transmission with a same or lower density in time, frequency, and/or space. The UE feeds back a CSI report wherein the CSI report includes a first CQI corresponding to a second CSI-RS transmission, and a second CQI corresponding to a subset of CSI-RS symbols, ports, and/or REs of the second CSI-RS transmission in conjunction with reported channel parameters.

Based on the fed back CQIs, a network may compare a quality of AI based CSI feedback compared with traditional CSI feedback. In some examples, one of two embodiments herein may be used to infer a CSI in a first band, component carrier ("CC"), and/or frequency range based on CSI-RS transmitted in a second band, CC, and/or frequency range.

In some examples, one of the two embodiments herein may be used to infer CSI in a first slot and/or slot group based on CSI-RS transmitted in a second slot and/or slot group. In various examples, one of the embodiments herein may be used to infer a CSI in a first set of CSI-RS ports based on CSI-RS transmitted in a second set of CSI-RS ports.

In some embodiments, the terms antenna, panel, and antenna panel are used interchangeably. An antenna panel may be hardware that is used for transmitting and/or receiving radio signals at frequencies lower than 6 GHz (e.g., frequency range 1 ("FR1")), or higher than 6 GHz (e.g., frequency range 2 ("FR2") or millimeter wave ("mmWave")). In certain embodiments, an antenna panel may include an array of antenna elements. Each antenna element may be connected to hardware, such as a phase shifter, that enables a control module to apply spatial parameters for transmission and/or reception of signals. The resulting radiation pattern may be called a beam, which may or may not be unimodal and may allow the device to amplify signals that are transmitted or received from spatial directions.

In various embodiments, an antenna panel may or may not be virtualized as an antenna port. An antenna panel may be connected to a baseband processing module through a radio frequency ("RF") chain for each transmission (e.g., egress) and reception (e.g., ingress) direction. A capability of a device in terms of a number of antenna panels, their duplexing capabilities, their beamforming capabilities, and so forth, may or may not be transparent to other devices. In some embodiments, capability information may be communicated via signaling or capability information may be provided to devices without a need for signaling. If information is available to other devices the information may be used for signaling or local decision making.

In some embodiments, a UE antenna panel may be a physical or logical antenna array including a set of antenna elements or antenna ports that share a common or a significant portion of a radio frequency ("RF") chain (e.g., in-phase and/or quadrature ("I/Q") modulator, analog to digital ("A/D") converter, local oscillator, phase shift network). The UE antenna panel or UE panel may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (e.g., active elements) of an antenna panel may require biasing or powering on of an RF chain which results in current drain or power consumption in a UE associated with the antenna panel (e.g., including power amplifier and/or low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In certain embodiments, depending on a UE's own implementation, a "UE panel" may have at least one of the following functionalities as an operational role of unit of antenna group to control its transmit ("TX") beam independently, unit of antenna group to control its transmission power independently, and/pr unit of antenna group to control its transmission timing independently. The "UE panel" may be transparent to a gNB. For certain conditions, a gNB or network may assume that a mapping between a UE's physical antennas to the logical entity "UE panel" may not be changed. For example, a condition may include until the next update or report from UE or include a duration of time over which the gNB assumes there will be no change to mapping. A UE may report its UE capability with respect to the "UE panel" to the gNB or network. The UE capability may include at least the number of "UE panels." In one embodiment, a UE may support UL transmission from one beam within a panel. With multiple panels, more than one beam (e.g., one beam per panel) may be used for UL transmission. In another embodiment, more than one beam per panel may be supported and/or used for UL transmission.

In some embodiments, an antenna port may be defined such that a channel over which a symbol on the antenna port is conveyed may be inferred from the channel over which another symbol on the same antenna port is conveyed.

In certain embodiments, two antenna ports are said to be quasi co-located ("QCL") if large-scale properties of a channel over which a symbol on one antenna port is conveyed may be inferred from the channel over which a symbol on another antenna port is conveyed. Large-scale properties may include one or more of delay spread, Doppler spread, Doppler shift, average gain, average delay, and/or spatial receive ("RX") parameters. Two antenna ports may be quasi co-located with respect to a subset of the large-scale properties and different subset of large-scale properties may be indicated by a QCL Type. For example, a qcl-Type may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}. Other QCL-Types may be defined based on combination of one or large-scale properties.

In various embodiments, spatial RX parameters may include one or more of: angle of arrival ("AoA"), dominant AoA, average AoA, angular spread, power angular spectrum ("PAS") of AoA, average angle of departure ("AoD"), PAS of AoD, transmit and/or receive channel correlation, transmit and/or receive beamforming, and/or spatial channel correlation.

In certain embodiments, QCL-TypeA, QCL-TypeB, and QCL-TypeC may be applicable for all carrier frequencies, but QCL-TypeD may be applicable only in higher carrier frequencies (e.g., mmWave, FR2, and beyond), where the UE may not be able to perform omni-directional transmission (e.g., the UE would need to form beams for directional transmission). For a QCL-TypeD between two reference signals A and B, the reference signal A is considered to be spatially co-located with reference signal B and the UE may assume that the reference signals A and B can be received with the same spatial filter (e.g., with the same RX beamforming weights).

In some embodiments, an "antenna port" may be a logical port that may correspond to a beam (e.g., resulting from beamforming) or may correspond to a physical antenna on a device. In certain embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights and/or a cyclic delay to the signal on each physical antenna. The physical antenna set may have antennas from a single module or panel or from multiple modules or panels. The weights may be fixed as in an antenna virtualization scheme, such as cyclic delay diversity ("CDD"). A procedure used to derive antenna ports from physical antennas may be specific to a device implementation and transparent to other devices.

In certain embodiments, a transmission configuration indicator ("TCI") state ("TCI-state") associated with a target transmission may indicate parameters for configuring a quasi-co-location relationship between the target transmission (e.g., target RS of demodulation ("DM") reference signal ("RS") ("DM-RS") ports of the target transmission during a transmission occasion) and a source reference signal (e.g., synchronization signal block ("SSB"), CSI-RS, and/or sounding reference signal ("SRS")) with respect to quasi co-location type parameters indicated in a corresponding TCI state. The TCI describes which reference signals are used as a QCL source, and what QCL properties may be derived from each reference signal. A device may receive a configuration of a plurality of transmission configuration indicator states for a serving cell for transmissions on the serving cell. In some embodiments, a TCI state includes at least one source RS to provide a reference (e.g., UE assumption) for determining QCL and/or a spatial filter.

In some embodiments, spatial relation information associated with a target transmission may indicate a spatial setting between a target transmission and a reference RS (e.g., SSB, CSI-RS, and/or SRS). For example, a UE may transmit a target transmission with the same spatial domain filter used for receiving a reference RS (e.g., DL RS such as SSB and/or CSI-RS). In another example, a UE may transmit a target transmission with the same spatial domain transmission filter used for the transmission of a RS (e.g., UL RS such as SRS). A UE may receive a configuration of multiple spatial relation information configurations for a serving cell for transmissions on a serving cell.

Figure 10:
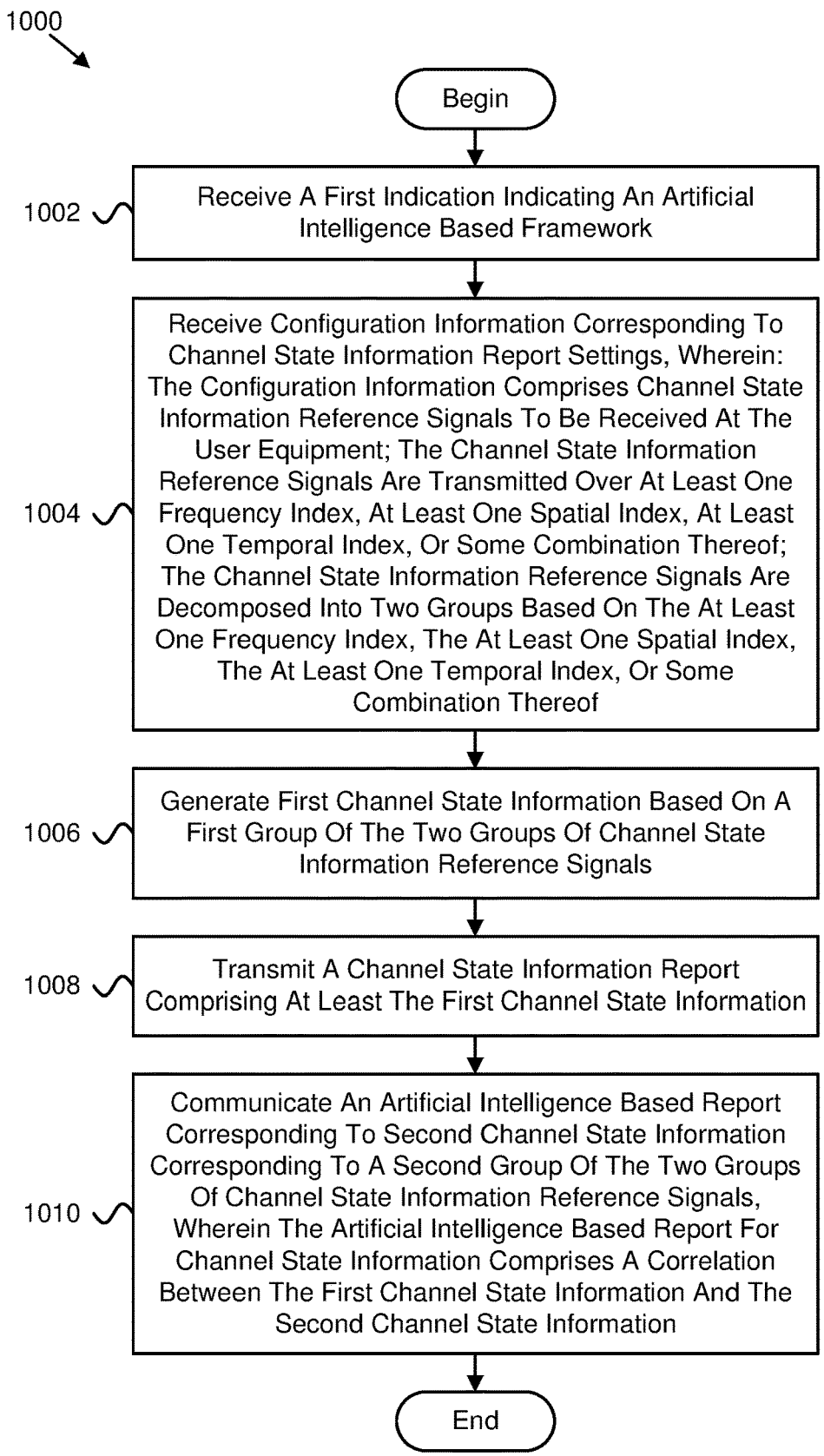
FIG. 10 is a flow chart diagram illustrating one embodiment of a method for configuring an artificial intelligence based framework.

FIG. 10 is a flow chart diagram illustrating one embodiment of a method 1000 for configuring an artificial intelligence based framework. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes receiving 1002, at a user equipment, a first indication indicating an artificial intelligence based framework. In some embodiments, the method 1000 includes receiving 1004 configuration information corresponding to channel state information report settings. The configuration information includes channel state information reference signals to be received at the user equipment; the channel state information reference signals are transmitted over at least one frequency index, at least one spatial index, at least one temporal index, or some combination thereof; and the channel state information reference signals are decomposed into two groups based on the at least one frequency index, the at least one spatial index, the at least one temporal index, or some combination thereof. In certain embodiments, the method 1000 includes generating 1006 first channel state information based on a first group of the two groups of channel state information reference signals. In various embodiments, the method 1000 includes transmitting 1008 a channel state information report including at least the first channel state information. In some embodiments, the method 1000 includes communicating 1010 an artificial intelligence based report corresponding to second channel state information corresponding to a second group of the two groups of channel state information reference signals. The artificial intelligence based report for channel state information includes a correlation between the first channel state information and the second channel state information.

In certain embodiments, the first indication comprises: a high layer parameter; an information element within a channel state information report configuration; an information element within a physical downlink shared channel configuration; a codebook type in a codebook configuration of the channel state information report configuration; a report quantity of the channel state information report configuration; a triggering parameter in downlink control information scheduling a physical downlink shared channel; medium-access-control control element signaling; or some combination thereof.

In some embodiments, the artificial intelligence based report comprises a second indication that indicates a group of the two groups, and the second indication comprises: a subset of channel state information reference signal ports from a set of configured channel state information reference signal ports; a subset of frequency sub-bands from a set of frequency sub-bands; a subset of time slots from a set of time slots; a subset of frequency bands from a set of frequency bands; a subset of channel state information reference signal resources from a set of channel state information reference signal resources; a subset of spatial basis indices from a set of spatial basis indices; a subset of frequency basis indices from a set of frequency basis indices; or some combination thereof.

In various embodiments, the artificial intelligence based report comprises: values of artificial intelligence based parameters corresponding to a number of selected inner layers, hidden layers, or a combination thereof; a number of selected input nodes; a number of selected output nodes; a number of selected nodes per inner layer; a weight per edge between two nodes in consecutive layers; a bias per node; or some combination thereof. In one embodiment, the artificial intelligence based report comprises differential changes corresponding to the artificial intelligence based parameters based on a reference artificial intelligence based report.

In certain embodiments, the method 1000 further comprises reporting two channel quality indicator values for a codeword, wherein: a first channel quality indicator value of the two channel quality indicator values corresponding to channel state information computed based on at least one of the two groups of channel state information reference signals; and a second channel quality indicator value of the two channel quality indicator values corresponding to the first group of channel state information reference signals and the correlation between the first channel state information and the second channel state information included in the artificial intelligence based report. In some embodiments, the method 1000 further comprises transmitting the artificial intelligence based report for channel state information parameters over a physical uplink control channel, a physical uplink shared channel, or a combination thereof.

In various embodiments, following the transmission of the artificial intelligence based report, the user equipment is configured with a channel state information reference signal configuration corresponding to the first group of channel state information reference signals. In one embodiment, the method 1000 further comprises feeding back a channel state information report corresponding to the two groups of channel state information reference signals.

In certain embodiments, the method 1000 further comprises receiving the artificial intelligence based report for channel state information based on the channel state information report, wherein the artificial intelligence based report corresponds to artificial intelligence based configuration information. In some embodiments, the artificial intelligence based report is received via: a higher layer configuration; medium-access-control control element signaling; a second stage of a multi-stage downlink control information sequence over a physical downlink control channel; or some combination thereof.

In various embodiments, following the reception of the artificial intelligence based report for channel state information, the user equipment is configured with a channel state information reference signal configuration corresponding to the first group of channel state information reference signals. In one embodiment, the artificial intelligence based report comprises channel state information corresponding to one group of the two groups of channel state information reference signals.

Figure 11:
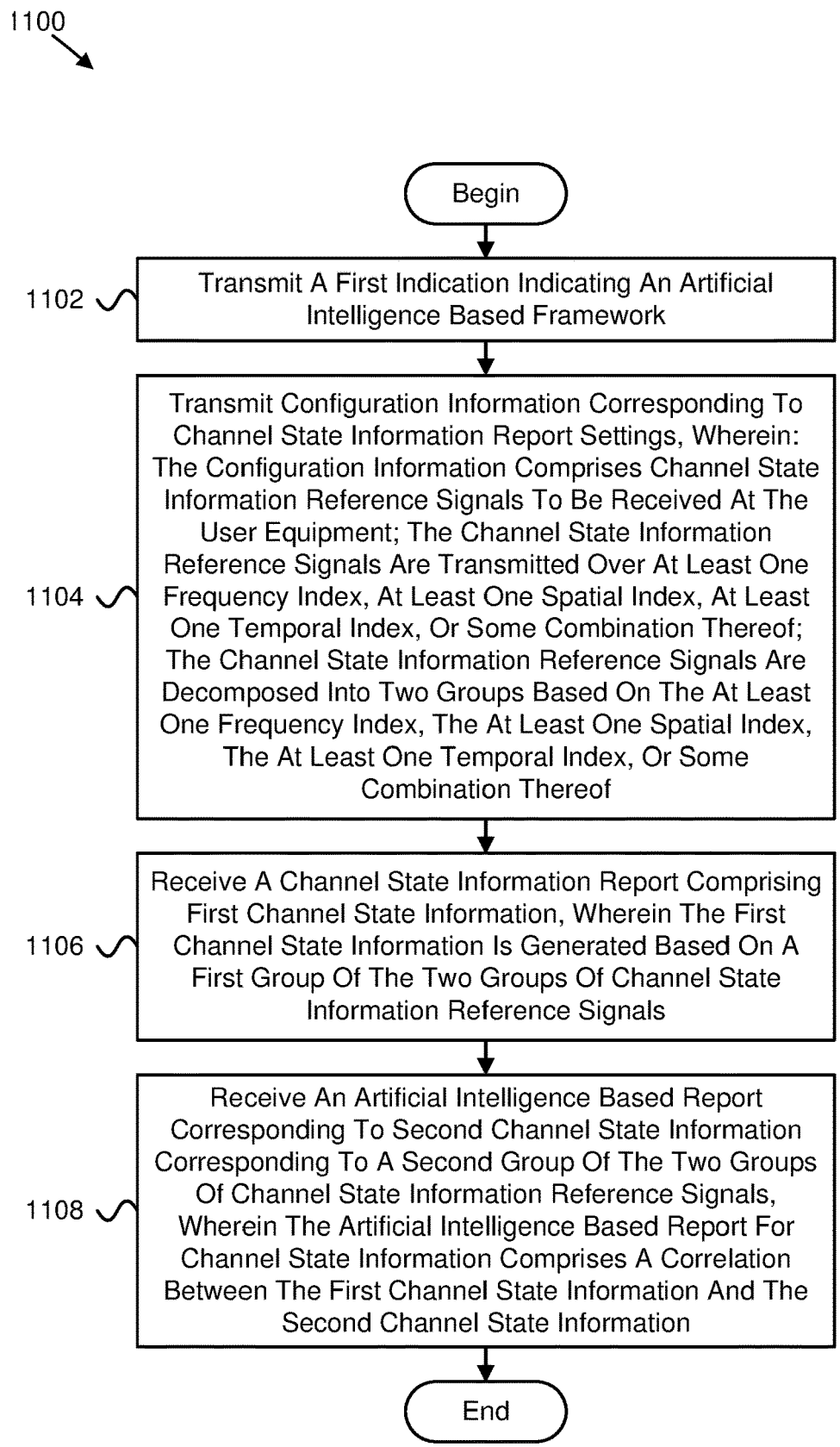
FIG. 11 is a flow chart diagram illustrating another embodiment of a method for configuring an artificial intelligence based framework.

FIG. 11 is a flow chart diagram illustrating another embodiment of a method 1100 for configuring an artificial intelligence based framework. In some embodiments, the method 1100 is performed by an apparatus, such as the network unit 104. In certain embodiments, the method 1100 may be performed by a processor executing program code, for example, a microcontroller, a microprocessor, a CPU, a GPU, an auxiliary processing unit, a FPGA, or the like.

In various embodiments, the method 1100 includes transmitting 1102, from a network device, a first indication indicating an artificial intelligence based framework. In some embodiments, the method 1100 includes transmitting 1104 configuration information corresponding to channel state information report settings. The configuration information includes channel state information reference signals to be received at the user equipment; the channel state information reference signals are transmitted over at least one frequency index, at least one spatial index, at least one temporal index, or some combination thereof; and the channel state information reference signals are decomposed into two groups based on the at least one frequency index, the at least one spatial index, the at least one temporal index, or some combination thereof. In certain embodiments, the method 1100 includes receiving 1106 a channel state information report comprising first channel state information. The first channel state information is generated based on a first group of the two groups of channel state information reference signals. In various embodiments, the method 1100 includes receiving 1108 an artificial intelligence based report corresponding to second channel state information corresponding to a second group of the two groups of channel state information reference signals. The artificial intelligence based report for channel state information includes a correlation between the first channel state information and the second channel state information.

In certain embodiments, the first indication comprises: a high layer parameter; an information element within a channel state information report configuration; an information element within a physical downlink shared channel configuration; a codebook type in a codebook configuration of the channel state information report configuration; a report quantity of the channel state information report configuration; a triggering parameter in downlink control information scheduling a physical downlink shared channel; medium-access-control control element signaling; or some combination thereof.

In some embodiments, the artificial intelligence based report comprises a second indication that indicates a group of the two groups, and the second indication comprises: a subset of channel state information reference signal ports from a set of configured channel state information reference signal ports; a subset of frequency sub-bands from a set of frequency sub-bands; a subset of time slots from a set of time slots; a subset of frequency bands from a set of frequency bands; a subset of channel state information reference signal resources from a set of channel state information reference signal resources; a subset of spatial basis indices from a set of spatial basis indices; a subset of frequency basis indices from a set of frequency basis indices; or some combination thereof.

In various embodiments, the artificial intelligence based report comprises: values of artificial intelligence based parameters corresponding to a number of selected inner layers, hidden layers, or a combination thereof; a number of selected input nodes; a number of selected output nodes; a number of selected nodes per inner layer; a weight per edge between two nodes in consecutive layers; a bias per node; or some combination thereof. In one embodiment, the artificial intelligence based report comprises differential changes corresponding to the artificial intelligence based parameters based on a reference artificial intelligence based report.

In certain embodiments, the method 1100 further comprises receiving two channel quality indicator values for a codeword, wherein: a first channel quality indicator value of the two channel quality indicator values corresponding to channel state information computed based on at least one of the two groups of channel state information reference signals; and a second channel quality indicator value of the two channel quality indicator values corresponding to the first group of channel state information reference signals and the correlation between the first channel state information and the second channel state information included in the artificial intelligence based report. In some embodiments, the method 1100 further comprises receiving the artificial intelligence based report for channel state information parameters over a physical uplink control channel, a physical uplink shared channel, or a combination thereof.

In various embodiments, the method 1100 further comprises transmitting the artificial intelligence based report for channel state information based on the channel state information report, wherein the artificial intelligence based report corresponds to artificial intelligence based configuration information. In one embodiment, the artificial intelligence based report is transmitted via: a higher layer configuration; medium-access-control control element signaling; a second stage of a multi-stage downlink control information sequence over a physical downlink control channel; or some combination thereof.

In one embodiment, a method of a user equipment comprises: receiving a first indication indicating an artificial intelligence based framework; receiving configuration information corresponding to channel state information report settings, wherein: the configuration information comprises channel state information reference signals to be received at the user equipment; the channel state information reference signals are transmitted over at least one frequency index, at least one spatial index, at least one temporal index, or some combination thereof; and the channel state information reference signals are decomposed into two groups based on the at least one frequency index, the at least one spatial index, the at least one temporal index, or some combination thereof; generating first channel state information based on a first group of the two groups of channel state information reference signals; transmitting a channel state information report comprising at least the first channel state information; and communicating an artificial intelligence based report corresponding to second channel state information corresponding to a second group of the two groups of channel state information reference signals, wherein the artificial intelligence based report for channel state information comprises a correlation between the first channel state information and the second channel state information.

In certain embodiments, the first indication comprises: a high layer parameter; an information element within a channel state information report configuration; an information element within a physical downlink shared channel configuration; a codebook type in a codebook configuration of the channel state information report configuration; a report quantity of the channel state information report configuration; a triggering parameter in downlink control information scheduling a physical downlink shared channel; medium-access-control control element signaling; or some combination thereof.

In some embodiments, the artificial intelligence based report comprises a second indication that indicates a group of the two groups, and the second indication comprises: a subset of channel state information reference signal ports from a set of configured channel state information reference signal ports; a subset of frequency sub-bands from a set of frequency sub-bands; a subset of time slots from a set of time slots; a subset of frequency bands from a set of frequency bands; a subset of channel state information reference signal resources from a set of channel state information reference signal resources; a subset of spatial basis indices from a set of spatial basis indices; a subset of frequency basis indices from a set of frequency basis indices; or some combination thereof.

In various embodiments, the artificial intelligence based report comprises: values of artificial intelligence based parameters corresponding to a number of selected inner layers, hidden layers, or a combination thereof; a number of selected input nodes; a number of selected output nodes; a number of selected nodes per inner layer; a weight per edge between two nodes in consecutive layers; a bias per node; or some combination thereof.

In one embodiment, the artificial intelligence based report comprises differential changes corresponding to the artificial intelligence based parameters based on a reference artificial intelligence based report.

In certain embodiments, the method further comprises reporting two channel quality indicator values for a codeword, wherein: a first channel quality indicator value of the two channel quality indicator values corresponding to channel state information computed based on at least one of the two groups of channel state information reference signals; and a second channel quality indicator value of the two channel quality indicator values corresponding to the first group of channel state information reference signals and the correlation between the first channel state information and the second channel state information included in the artificial intelligence based report.

In some embodiments, the method further comprises transmitting the artificial intelligence based report for channel state information parameters over a physical uplink control channel, a physical uplink shared channel, or a combination thereof.

In various embodiments, following the transmission of the artificial intelligence based report, the user equipment is configured with a channel state information reference signal configuration corresponding to the first group of channel state information reference signals.

In one embodiment, the method further comprises feeding back a channel state information report corresponding to the two groups of channel state information reference signals.

In certain embodiments, the method further comprises receiving the artificial intelligence based report for channel state information based on the channel state information report, wherein the artificial intelligence based report corresponds to artificial intelligence based configuration information.

In some embodiments, the artificial intelligence based report is received via: a higher layer configuration; medium-access-control control element signaling; a second stage of a multi-stage downlink control information sequence over a physical downlink control channel; or some combination thereof.

In various embodiments, following the reception of the artificial intelligence based report for channel state information, the user equipment is configured with a channel state information reference signal configuration corresponding to the first group of channel state information reference signals.

In one embodiment, the artificial intelligence based report comprises channel state information corresponding to one group of the two groups of channel state information reference signals.

In one embodiment, an apparatus comprises a user equipment. The apparatus further comprises: a receiver that: receives a first indication indicating an artificial intelligence based framework; and receives configuration information corresponding to channel state information report settings, wherein: the configuration information comprises channel state information reference signals to be received at the user equipment; the channel state information reference signals are transmitted over at least one frequency index, at least one spatial index, at least one temporal index, or some combination thereof; and the channel state information reference signals are decomposed into two groups based on the at least one frequency index, the at least one spatial index, the at least one temporal index, or some combination thereof; a processor that generates first channel state information based on a first group of the two groups of channel state information reference signals; and a transmitter that: transmits a channel state information report comprising at least the first channel state information; and communicates an artificial intelligence based report corresponding to second channel state information corresponding to a second group of the two groups of channel state information reference signals, wherein the artificial intelligence based report for channel state information comprises a correlation between the first channel state information and the second channel state information.

In certain embodiments, the first indication comprises: a high layer parameter; an information element within a channel state information report configuration; an information element within a physical downlink shared channel configuration; a codebook type in a codebook configuration of the channel state information report configuration; a report quantity of the channel state information report configuration; a triggering parameter in downlink control information scheduling a physical downlink shared channel; medium-access-control control element signaling; or some combination thereof.

In some embodiments, the artificial intelligence based report comprises a second indication that indicates a group of the two groups, and the second indication comprises: a subset of channel state information reference signal ports from a set of configured channel state information reference signal ports; a subset of frequency sub-bands from a set of frequency sub-bands; a subset of time slots from a set of time slots; a subset of frequency bands from a set of frequency bands; a subset of channel state information reference signal resources from a set of channel state information reference signal resources; a subset of spatial basis indices from a set of spatial basis indices; a subset of frequency basis indices from a set of frequency basis indices; or some combination thereof.

In various embodiments, the artificial intelligence based report comprises: values of artificial intelligence based parameters corresponding to a number of selected inner layers, hidden layers, or a combination thereof; a number of selected input nodes; a number of selected output nodes; a number of selected nodes per inner layer; a weight per edge between two nodes in consecutive layers; a bias per node; or some combination thereof.

In one embodiment, the artificial intelligence based report comprises differential changes corresponding to the artificial intelligence based parameters based on a reference artificial intelligence based report.

In certain embodiments, the transmitter reports two channel quality indicator values for a codeword, and wherein: a first channel quality indicator value of the two channel quality indicator values corresponding to channel state information computed based on at least one of the two groups of channel state information reference signals; and a second channel quality indicator value of the two channel quality indicator values corresponding to the first group of channel state information reference signals and the correlation between the first channel state information and the second channel state information included in the artificial intelligence based report.

In some embodiments, the transmitter transmits the artificial intelligence based report for channel state information parameters over a physical uplink control channel, a physical uplink shared channel, or a combination thereof.

In various embodiments, following the transmission of the artificial intelligence based report, the user equipment is configured with a channel state information reference signal configuration corresponding to the first group of channel state information reference signals.

In one embodiment, the transmitter feeds back a channel state information report corresponding to the two groups of channel state information reference signals.

In certain embodiments, the receiver receives the artificial intelligence based report for channel state information based on the channel state information report, wherein the artificial intelligence based report corresponds to artificial intelligence based configuration information.

In some embodiments, the artificial intelligence based report is received via: a higher layer configuration; medium-access-control control element signaling; a second stage of a multi-stage downlink control information sequence over a physical downlink control channel; or some combination thereof.

In various embodiments, following the reception of the artificial intelligence based report for channel state information, the user equipment is configured with a channel state information reference signal configuration corresponding to the first group of channel state information reference signals.

In one embodiment, the artificial intelligence based report comprises channel state information corresponding to one group of the two groups of channel state information reference signals.

In one embodiment, a method of a network device comprises: transmitting a first indication indicating an artificial intelligence based framework; transmitting configuration information corresponding to channel state information report settings, wherein: the configuration information comprises channel state information reference signals to be received at the user equipment; the channel state information reference signals are transmitted over at least one frequency index, at least one spatial index, at least one temporal index, or some combination thereof; and the channel state information reference signals are decomposed into two groups based on the at least one frequency index, the at least one spatial index, the at least one temporal index, or some combination thereof; receiving a channel state information report comprising first channel state information, wherein the first channel state information is generated based on a first group of the two groups of channel state information reference signals; and receiving an artificial intelligence based report corresponding to second channel state information corresponding to a second group of the two groups of channel state information reference signals, wherein the artificial intelligence based report for channel state information comprises a correlation between the first channel state information and the second channel state information.

In certain embodiments, the first indication comprises: a high layer parameter; an information element within a channel state information report configuration; an information element within a physical downlink shared channel configuration; a codebook type in a codebook configuration of the channel state information report configuration; a report quantity of the channel state information report configuration; a triggering parameter in downlink control information scheduling a physical downlink shared channel; medium-access-control control element signaling; or some combination thereof.

In some embodiments, the artificial intelligence based report comprises a second indication that indicates a group of the two groups, and the second indication comprises: a subset of channel state information reference signal ports from a set of configured channel state information reference signal ports; a subset of frequency sub-bands from a set of frequency sub-bands; a subset of time slots from a set of time slots; a subset of frequency bands from a set of frequency bands; a subset of channel state information reference signal resources from a set of channel state information reference signal resources; a subset of spatial basis indices from a set of spatial basis indices; a subset of frequency basis indices from a set of frequency basis indices; or some combination thereof.

In various embodiments, the artificial intelligence based report comprises: values of artificial intelligence based parameters corresponding to a number of selected inner layers, hidden layers, or a combination thereof; a number of selected input nodes; a number of selected output nodes; a number of selected nodes per inner layer; a weight per edge between two nodes in consecutive layers; a bias per node; or some combination thereof.

In one embodiment, the artificial intelligence based report comprises differential changes corresponding to the artificial intelligence based parameters based on a reference artificial intelligence based report.

In certain embodiments, the method further comprises receiving two channel quality indicator values for a codeword, wherein: a first channel quality indicator value of the two channel quality indicator values corresponding to channel state information computed based on at least one of the two groups of channel state information reference signals; and a second channel quality indicator value of the two channel quality indicator values corresponding to the first group of channel state information reference signals and the correlation between the first channel state information and the second channel state information included in the artificial intelligence based report.

In some embodiments, the method further comprises receiving the artificial intelligence based report for channel state information parameters over a physical uplink control channel, a physical uplink shared channel, or a combination thereof.

In various embodiments, the method further comprises transmitting the artificial intelligence based report for channel state information based on the channel state information report, wherein the artificial intelligence based report corresponds to artificial intelligence based configuration information.

In one embodiment, the artificial intelligence based report is transmitted via: a higher layer configuration; medium-access-control control element signaling; a second stage of a multi-stage downlink control information sequence over a physical downlink control channel; or some combination thereof.

In one embodiment, an apparatus of a network device comprises: a transmitter that: transmits a first indication indicating an artificial intelligence based framework; and transmits configuration information corresponding to channel state information report settings, wherein: the configuration information comprises channel state information reference signals to be received at the user equipment; the channel state information reference signals are transmitted over at least one frequency index, at least one spatial index, at least one temporal index, or some combination thereof; and the channel state information reference signals are decomposed into two groups based on the at least one frequency index, the at least one spatial index, the at least one temporal index, or some combination thereof; and a receiver that: receives a channel state information report comprising first channel state information, wherein the first channel state information is generated based on a first group of the two groups of channel state information reference signals; and receives an artificial intelligence based report corresponding to second channel state information corresponding to a second group of the two groups of channel state information reference signals, wherein the artificial intelligence based report for channel state information comprises a correlation between the first channel state information and the second channel state information.

In certain embodiments, the first indication comprises: a high layer parameter; an information element within a channel state information report configuration; an information element within a physical downlink shared channel configuration; a codebook type in a codebook configuration of the channel state information report configuration; a report quantity of the channel state information report configuration; a triggering parameter in downlink control information scheduling a physical downlink shared channel; medium-access-control control element signaling; or some combination thereof.

In some embodiments, the artificial intelligence based report comprises a second indication that indicates a group of the two groups, and the second indication comprises: a subset of channel state information reference signal ports from a set of configured channel state information reference signal ports; a subset of frequency sub-bands from a set of frequency sub-bands; a subset of time slots from a set of time slots; a subset of frequency bands from a set of frequency bands; a subset of channel state information reference signal resources from a set of channel state information reference signal resources; a subset of spatial basis indices from a set of spatial basis indices; a subset of frequency basis indices from a set of frequency basis indices; or some combination thereof.

In various embodiments, the artificial intelligence based report comprises: values of artificial intelligence based parameters corresponding to a number of selected inner layers, hidden layers, or a combination thereof; a number of selected input nodes; a number of selected output nodes; a number of selected nodes per inner layer; a weight per edge between two nodes in consecutive layers; a bias per node; or some combination thereof.

In one embodiment, the artificial intelligence based report comprises differential changes corresponding to the artificial intelligence based parameters based on a reference artificial intelligence based report.

In certain embodiments, the receiver receives two channel quality indicator values for a codeword, and wherein: a first channel quality indicator value of the two channel quality indicator values corresponding to channel state information computed based on at least one of the two groups of channel state information reference signals; and a second channel quality indicator value of the two channel quality indicator values corresponding to the first group of channel state information reference signals and the correlation between the first channel state information and the second channel state information included in the artificial intelligence based report.

In some embodiments, the receiver receives the artificial intelligence based report for channel state information parameters over a physical uplink control channel, a physical uplink shared channel, or a combination thereof.

In various embodiments, the transmitter transmits the artificial intelligence based report for channel state information based on the channel state information report, wherein the artificial intelligence based report corresponds to artificial intelligence based configuration information.

In one embodiment, the artificial intelligence based report is transmitted via: a higher layer configuration; medium-access-control control element signaling; a second stage of a multi-stage downlink control information sequence over a physical downlink control channel; or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
   receiving a first indication indicating an artificial intelligence based framework;
   receiving configuration information corresponding to channel state information report settings, wherein:
      the configuration information comprises channel state information reference signals to be received at the UE;
      the channel state information reference signals are transmitted over at least one frequency index, at least one spatial index, at least one temporal index, or a combination thereof; and
      the channel state information reference signals are decomposed into two groups based on the at least one frequency index, the at least one spatial index, the at least one temporal index, or a combination thereof;
   generating first channel state information based on a first group of the two groups of channel state information reference signals;
   transmitting a channel state information report comprising at least the first channel state information; and
   communicating an artificial intelligence based report corresponding to second channel state information corresponding to a second group of the two groups of channel state information reference signals, wherein the artificial intelligence based report comprises a correlation between the first channel state information and the second channel state information.

2. The method of claim 1, wherein the first indication comprises:
   a high layer parameter;
   an information element within a channel state information report configuration;
   an information element within a physical downlink shared channel configuration;
   a codebook type in a codebook configuration of the channel state information report configuration;
   a report quantity of the channel state information report configuration;
   a triggering parameter in downlink control information scheduling a physical downlink shared channel;
   medium-access-control control-element signaling;
   or a combination thereof.

3. The method of claim 1, wherein the artificial intelligence based report comprises a second indication that indicates a group of the two groups, and the second indication comprises:
   a subset of channel state information reference signal ports from a set of configured channel state information reference signal ports;
   a subset of frequency sub-bands from a set of frequency sub-bands;
   a subset of time slots from a set of time slots;
   a subset of frequency bands from a set of frequency bands;
   a subset of channel state information reference signal resources from a set of channel state information reference signal resources;
   a subset of spatial basis indices from a set of spatial basis indices;
   a subset of frequency basis indices from a set of frequency basis indices;
   or a combination thereof.

4. The method of claim 1, wherein the artificial intelligence based report comprises:
   values of artificial intelligence based parameters corresponding to a number of selected inner layers, hidden layers, or a combination thereof;
   a number of selected input nodes;
   a number of selected output nodes;
   a number of selected nodes per inner layer;
   a weight per edge between two nodes in consecutive layers;
   a bias per node;
   or a combination thereof.

5. The method of claim 4, wherein the artificial intelligence based report comprises differential changes corresponding to the artificial intelligence based parameters based on a reference artificial intelligence based report.

6. The method of claim 1, further comprising reporting two channel quality indicator values for a codeword, wherein:
   a first channel quality indicator value of the two channel quality indicator values corresponding to channel state information computed based on at least one of the two groups of channel state information reference signals; and
   a second channel quality indicator value of the two channel quality indicator values corresponding to the first group of channel state information reference signals and the correlation between the first channel state information and the second channel state information included in the artificial intelligence based report.

7. The method of claim 1, further comprising transmitting the artificial intelligence based report over a physical uplink control channel, a physical uplink shared channel, or a combination thereof.

8. The method of claim 7, wherein, following transmitting the artificial intelligence based report, the UE is configured with a channel state information reference signal configuration corresponding to the first group of channel state information reference signals.

9. The method of claim 7, further comprising feeding back a channel state information report corresponding to the two groups of channel state information reference signals.

10. The method of claim 1, further comprising receiving the artificial intelligence based report based on the channel state information report, wherein the artificial intelligence based report corresponds to artificial intelligence based configuration information.

11. The method of claim 10, wherein the artificial intelligence based report is received via:
a higher layer configuration;
medium-access-control control-element signaling;
a second stage of a multi-stage downlink control information sequence over a physical downlink control channel;
or a combination thereof.

12. The method of claim 11, wherein, following receiving the artificial intelligence based report, the UE is configured with a channel state information reference signal configuration corresponding to the first group of channel state information reference signals.

13. The method of claim 12, wherein the artificial intelligence based report comprises channel state information corresponding to one group of the two groups of channel state information reference signals.

14. A user equipment (UE), comprising:
at least one memory; and
at least one processor coupled with the at least one memory and configured to cause the UE to:
receive a first indication indicating an artificial intelligence based framework;
receive configuration information corresponding to channel state information report settings, wherein:
the configuration information comprises channel state information reference signals to be received at the UE;
the channel state information reference signals are transmitted over at least one frequency index, at least one spatial index, at least one temporal index, or a combination thereof; and
the channel state information reference signals are decomposed into two groups based on the at least one frequency index, the at least one spatial index, the at least one temporal index, or a combination thereof;
generate first channel state information based on a first group of the two groups of channel state information reference signals;
transmit a channel state information report comprising at least the first channel state information; and
communicate an artificial intelligence based report corresponding to second channel state information corresponding to a second group of the two groups of channel state information reference signals, wherein the artificial intelligence based report comprises a correlation between the first channel state information and the second channel state information.

15. The UE of claim 14, wherein the artificial intelligence based report comprises a second indication that indicates a group of the two groups, and the second indication comprises:
a subset of channel state information reference signal ports from a set of configured channel state information reference signal ports;
a subset of frequency sub-bands from a set of frequency sub-bands;
a subset of time slots from a set of time slots;
a subset of frequency bands from a set of frequency bands;
a subset of channel state information reference signal resources from a set of channel state information reference signal resources;
a subset of spatial basis indices from a set of spatial basis indices;
a subset of frequency basis indices from a set of frequency basis indices;
or a combination thereof.

16. The UE of claim 14, wherein the at least one processor is configured to cause the UE to report two channel quality indicator values for a codeword, and wherein:
a first channel quality indicator value of the two channel quality indicator values corresponding to channel state information computed based on at least one of the two groups of channel state information reference signals; and
a second channel quality indicator value of the two channel quality indicator values corresponding to the first group of channel state information reference signals and the correlation between the first channel state information and the second channel state information included in the artificial intelligence based report.

17. The UE of claim 14, wherein the at least one processor is configured to cause the UE to transmit the artificial intelligence based report over a physical uplink control channel, a physical uplink shared channel, or a combination thereof.

18. A base station, comprising:
at least one memory; and
at least one processor coupled with the at least one memory and configured to cause the base station to:
transmit a first indication indicating an artificial intelligence based framework;
transmit configuration information corresponding to channel state information report settings, wherein:
the configuration information comprises channel state information reference signals to be received at a user equipment (UE);
the channel state information reference signals are transmitted over at least one frequency index, at least one spatial index, at least one temporal index, or a combination thereof; and
the channel state information reference signals are decomposed into two groups based on the at least one frequency index, the at least one spatial index, the at least one temporal index, or a combination thereof;
receive a channel state information report comprising first channel state information, wherein the first channel state information is generated based on a first group of the two groups of channel state information reference signals; and
receive an artificial intelligence based report corresponding to second channel state information corresponding to a second group of the two groups of channel state information reference signals, wherein the artificial intelligence based report comprises a correlation between the first channel state information and the second channel state information.

19. The base station of claim 18, wherein the at least one processor is configured to cause the base station to transmit the artificial intelligence based report based on the channel state information report, and the artificial intelligence based report corresponds to artificial intelligence based configuration information.

20. The base station of claim 19, wherein the artificial intelligence based report is transmitted via:

a higher layer configuration;
medium-access-control control element signaling;
a second stage of a multi-stage downlink control information sequence over a physical downlink control channel;
or a combination thereof.

* * * * *